United States Patent [19]

Jasper et al.

[11] 4,416,017

[45] Nov. 15, 1983

[54] APPARATUS AND METHOD FOR ATTENUATING INTERFERING SIGNALS

[75] Inventors: Steven C. Jasper, Schaumburg; Robert V. Janc, Palos Heights; David S. Robins, Buffalo Grove; Michael H. Retzer, Schaumburg, all of Ill.

[73] Assignee: Motorola, Inc., Schaumburg, Ill.

[21] Appl. No.: 222,459

[22] Filed: Jan. 5, 1981

[51] Int. Cl.³ .............................................. H04B 15/00
[52] U.S. Cl. ..................................... 375/99; 364/452; 364/728; 343/389; 455/296
[58] Field of Search ...................... 375/95, 96, 99, 101, 375/102; 328/165, 151; 364/574, 604, 452, 728, 819; 455/303, 304, 305, 296, 306; 343/103, 100 CL

[56] References Cited

U.S. PATENT DOCUMENTS

| | | | |
|---|---|---|---|
| 3,045,916 | 7/1962 | Downes | 364/819 |
| 3,307,408 | 3/1967 | Thomas et al. | 307/225 R |
| 3,359,409 | 12/1967 | Goldstein | 364/728 |
| 3,478,268 | 11/1969 | Coviello | 455/306 |
| 3,544,904 | 12/1970 | Eness | 455/304 |
| 3,700,876 | 10/1972 | Gray | 364/819 |
| 3,706,933 | 12/1972 | Bidell et al. | 375/1 |
| 3,916,320 | 10/1975 | Roll et al. | 455/304 |
| 3,961,172 | 6/1976 | Hutcheon | 364/819 |
| 4,010,421 | 3/1977 | Lind | 375/20 |
| 4,025,775 | 5/1977 | Beauvais et al. | 364/604 |
| 4,038,540 | 7/1977 | Roberts | 455/305 |
| 4,093,923 | 6/1978 | McCormick | 328/165 |
| 4,241,312 | 12/1980 | Barnes et al. | 375/99 |
| 4,253,189 | 2/1981 | Lemoussu et al. | 375/96 |

*Primary Examiner*—Benedict V. Safourek
*Assistant Examiner*—Stephen Chin
*Attorney, Agent, or Firm*—Mark P. Kahler; Edward M. Roney; James W. Gillman

[57] ABSTRACT

A method and apparatus for attenuating an interfering signal corrupting a desired Loran C signal is provided. An interfering signal sample is determined which occurs at the peak of the autocorrelation function of the interfering signal such that the period of the interferer is known. The sample occurring at the peak of the autocorrelation function is added to or subtracted from the desired Loran C signal sample taken at a predetermined reference point during the pulses thereof such that the interfering signal is cancelled or substantially attenuated.

6 Claims, 11 Drawing Figures

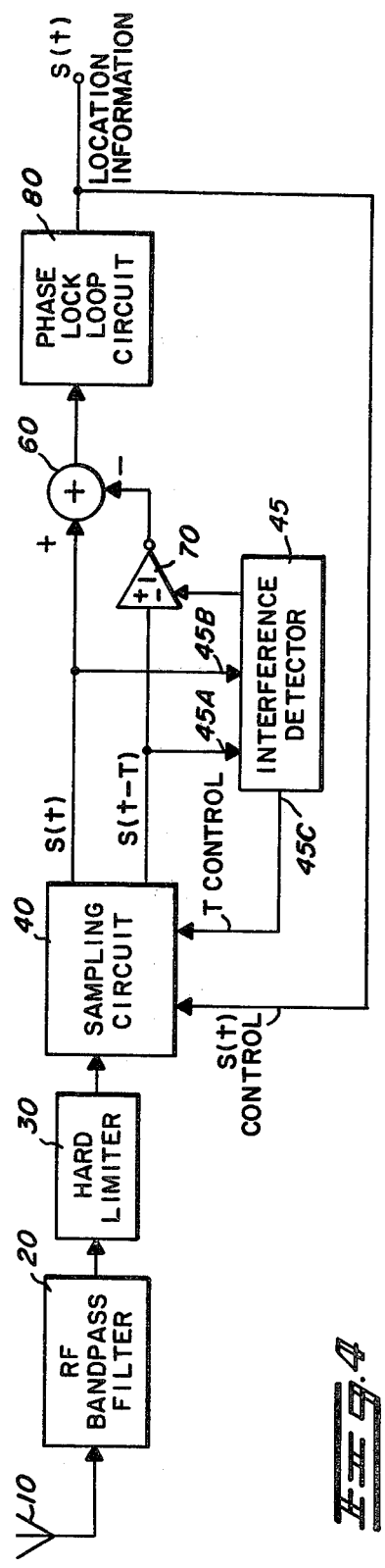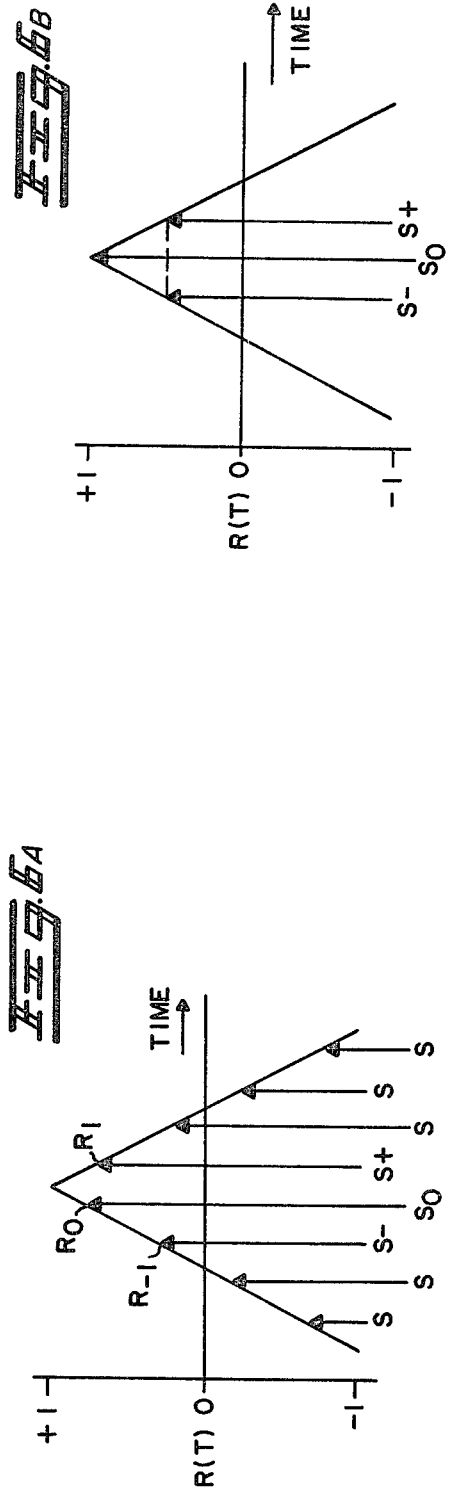

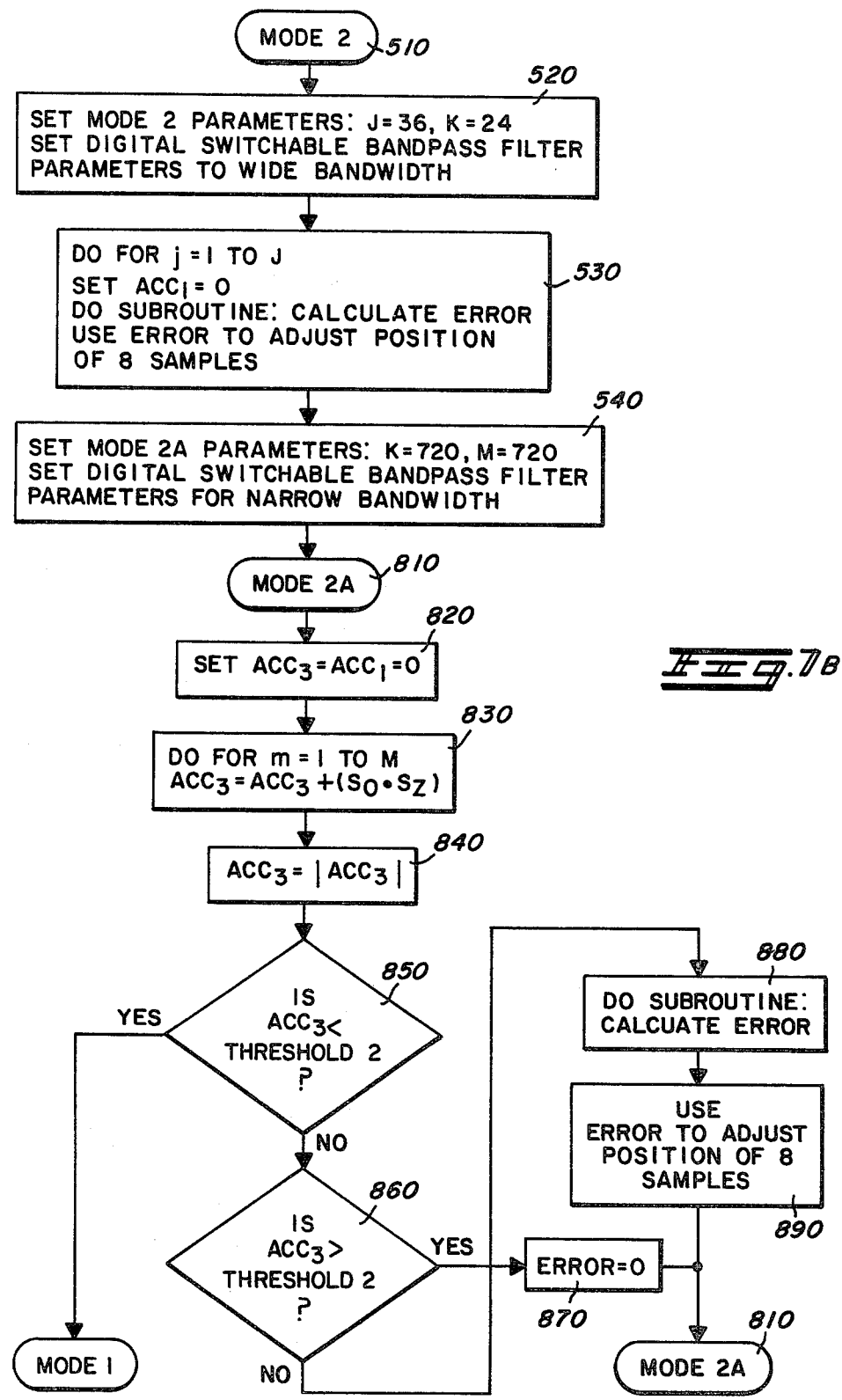

APPARATUS AND METHOD FOR ATTENUATING INTERFERING SIGNALS

BACKGROUND OF THE INVENTION

1. Field of the Invention

This invention relates to systems for attenuating undesired interfering signals and, more particularly, to apparatus for substantially attenuating an undesired signal interfering with a Loran C radionavigation system.

2. Description of the Prior Art

To determine the approximate location of a ship or other mobile vehicle a Loran C receiving apparatus may be employed in such vehicle. A typical Loran C radionavigation system includes a master transmitting station and at least two secondary transmitting stations situated at different preselected locations. Each station transmits a pulse group, that is, a series of eight radio frequency pulses, during different nonoverlapping time intervals. More specifically, the master transmitting station transmits a pulse group followed in time by a transmission of a pulse group by the first secondary station. After the first secondary station has transmitted a pulse group, the second secondary station transmits a pulse group. This sequence of pulse transmission by the master and secondary stations continues ad infinitum.

The time difference (TD) is defined to be the difference in time between the arrival of the master station signal and one of the secondary station signals at the Loran C receiver site. The time difference associated with the first secondary station and the time difference associated with the second secondary station each varies according to the particular location at which the Loran C receiver is situated. Each time difference is typically displayed by the Loran C receiver such that two intersecting hyperbolic lines of position (LOP) may be drawn on a map to determine the location of the Loran C receiver site. For a more complete discussion of the Loran C radionavigation scheme, refer to U.S. Patent, Jasper et al., Ser. No. 222,422, filed concurrently herewith and assigned to the instant assignee.

A Loran C receiver often must operate in a harsh receiving environment. That is, undesired extraneous radio frequency signals may be present near or in the passband of the Loran C receiver (typically 90 kHz-110 kHz). To determine the above-discussed time differences, a Loran C receiver typically locks to the third positive-going zero crossing of the carrier of each of the pulses of the pulse group transmitted by each of the master and secondary stations, respectively. Such zero crossing is known as a pulse tracking reference point or PTR. The presence of extraneous signals will interfere with and, in extreme cases, completely prevent locking to the pulse tracking reference points of the Loran C pulse groups resulting in decreased accuracy of location determination or complete prevention of location determination. It is clear that attenuation of such extraneous interfering signals is desirable.

In one conventional Loran C receiving apparatus, a tunable bandpass filter is employed in conjunction with a tunable notch filter to attenuate undesired radio frequency signals interfering with a Loran C signal. The tunable bandpass filter is connected to a meter scaling and drive circuit which is coupled to a meter within view of the receiver operator. The operator adjusts the tunable bandpass filter and reads the relative amplitude of the interfering signal on the meter. The tunable notch filter is then adjusted to remove the interference. Although such a notch filter tuning arrangement performs well to attenuate interfering signals occurring outside of the passband of the receiver (again typically 90-110 kHz), such a filter arrangement causes undesirable Loran C pulse distortion when the notch filter is employed to attenuate a signal within the Loran C passband.

Another receiving apparatus conventionally employed to receive Loran C signals includes an interference canceller which operates to attenuate undesired signals within the Loran C signal bandwidth. A voltage controlled oscillator is phase locked to the interfering signal. The amplitude of the oscillator output signal is adjusted such that when the oscillator output signal is combined with the Loran C signal and the interfering signal at a differential amplifier, the oscillator output signal and the interfering signal cancel such that the Loran C signal remains without interference. This cancellation technique may be employed to facilitate its implementation.

It is one object of the present invention to substantially attenuate undesired radio frequency signals appearing within the Loran C bandwidth in a manner that may be digitally implemented.

Another object of the invention is to substantially attenuate signals interfering with a desired Loran C signal without distorting the Loran C pulses.

These and other objects of the invention will become apparent to those skilled in the art upon consideration of the following description of the invention.

BRIEF SUMMARY OF THE INVENTION

The present invention is directed to substantially attenuating a radio frequency signal interfering with a Loran C signal. It is, however, noted that the invention may be employed to attenuate undesired radio frequency signals interfering with virtually any type of pulsed periodic waveform.

In accordance with one embodiment of the invention, apparatus for substantially attenuating an undesired first radio frequency signal interfering with a second pulsed radio frequency signal (for example, a Loran C signal) includes a receiver for receiving the first and second signals. A sampling circuit is coupled to the receiver to sample pulses of the second signal at a predetermined waveform reference point thereof. Morever, the sampling circuit samples the first signal at points in time corresponding to peaks of the autocorrelation function of the first signal with respect to the reference point samples of the second signal pulses. A combining circuit is coupled to the sampling circuit to combine the samples of the first signal with the corresponding samples of the second signal so as to substantially attenuate the first signal.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE DRAWINGS

FIG. 4 is a block diagram of the interference attenuator of the present invention.

FIGS. 6A and 6B illustrate sampling of the interfering signal in such a manner as to locate the peak of the autocorrelation function thereof.

FIG. 7A-FIG. 7D are flowcharts showing the steps which may be used to attenuate an interfering signal in accordance with the method of the invention.

DETAILED DESCRIPTION OF THE PREFERRED EMBODIMENT

Figure 1:
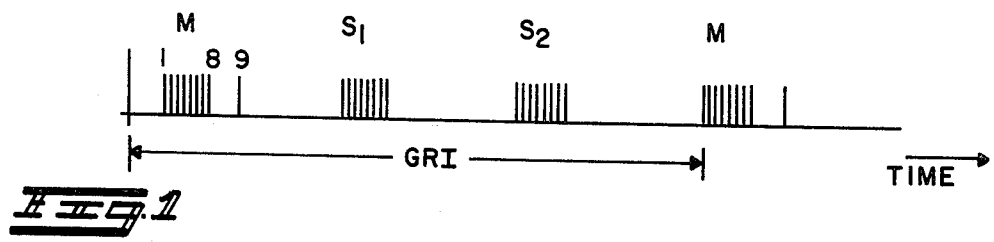
FIG. 1 is a graph illustrating the time relationship of the different intervals during which the Loran C master and secondary stations transmit.

FIG. 1 shows the relationship in time of the different intervals during which the Loran C master station, first secondary station $S_1$ and second secondary station $S_2$, respectively, transmit. As seen, the master station transmits a series of eight radio frequency pulses during a first time interval. Secondary station $S_1$ then transmits a pulse group of eight radio pulses during a second time interval followed in time by transmission of a pulse group of eight pulses by secondary station $S_2$ during a third time interval. This sequence of pulse group transmission continues ad infinitum in the order set forth above. To derive the location or fix of the site of a Loran C receiver, the times at which the third positive zero crossings of the pulses of the pulse groups of the master and secondary stations occur are accurately monitored. The third zero crossing is employed as a convenient pulse tracking reference point (PTR) although other zero crossings may be employed as reference points. The conventional Loran C receiver determines the time difference (TD) between the time of the reception of the PTR of the master station with respect to the first secondary station thus yielding one hyperbolic line of position. The receiver additionally determines the time difference between the PTR of the received master station pulse groups and the PTR of the second received secondary station pulse groups thus yielding a second hyperbolic line of position. The intersection of the lines of position indicates the site of the Loran C receiver.

Figure 2:
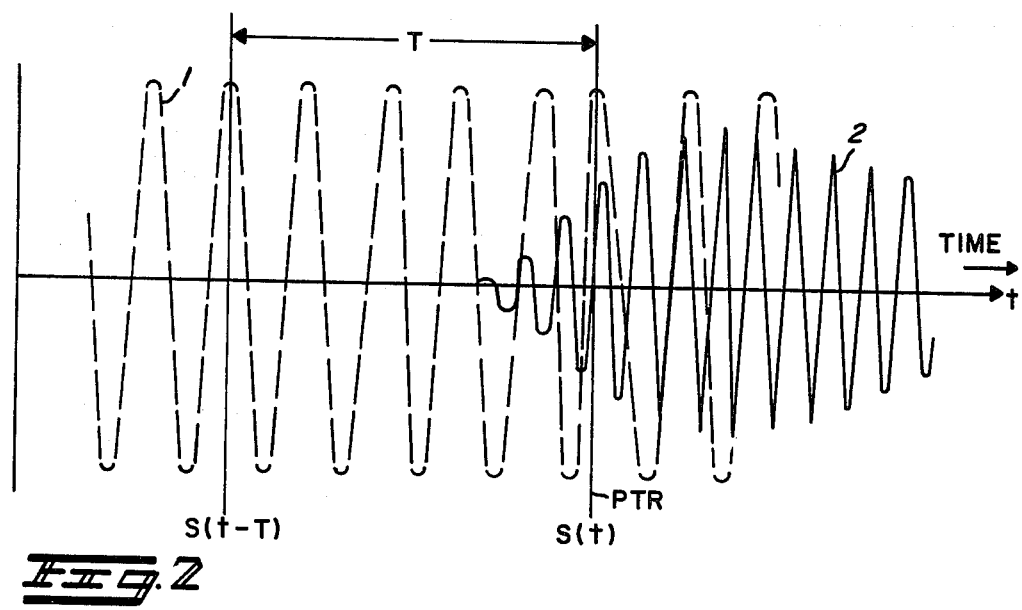
FIG. 2 shows a typical Loran C signal corrupted by a narrowband interfering signal.

However, if an interfering signal such as the narrowband signal designated 1 in FIG. 2 having a frequency near that of the desired Loran C signal 2 is present at the receiver site, a conventional Loran C receiver may become unlocked from the PTR. Under such conditions the fix determined by the receiver is inaccurate. FIG. 2 will assist in illustrating the method of the invention for attenuating such narrowband interference 1 which tends to mask the PTR of a desired Loran C signal 2. It is noted that samples of the Loran C pulse 2 include both an interfering signal portion and a Loran C signal portion. A sample S(t) of each Loran C pulse 2 is taken at the receiver's current estimate of the PTR. In the example illustrated in FIG. 2, it is seen that the interfering signal 1 exhibits a positive maximum at the PTR of the Loran C pulse 2, whereas the Loran C signal portion very nearly equals zero at the PTR estimate because the PTR is by definition a zero crossing. Thus, the value of the S(t) sample in FIG. 2 is almost totally dependent on the instantaneous value of the interfering signal 1 plus received noise.

A sample S(t-T) of the interfering signal 1 is taken at a time T prior to the S(t) PTR sample. The value T is selected such that the sample S(t-T) exhibits an amplitude substantially identical to that of the interfering signal at the PTR. Simply speaking, the sample S(t-T) is selected such that it is maximally correlated either positively or negatively with the S(t) sample. That is, the S(t-T) sample is timed to occur at a peak of the autocorrelation function of the interfering signal with respect to the S(t) sample.

The autocorrelation function R(T) of a waveform is represented by the equation $$R(T) = \frac{1}{N} \sum_{1}^{N} S(t) S(t - T)$$

wherein N is a selected number of samples.

When the above condition is achieved, namely that the S(t-T) sample and the S(t) sample are highly correlated or anticorrelated, then the value of the interfering signal sample S(t-T) is approximately equal to (or approximately equal to but negative with respect to) the interfering signal voltage portion of the PTR sample S(t). To cancel or substantially attenuate the interfering signal at the PTR at which tracking is critical, the S(t-T) sample is subtracted from the S(t) sample at the PTR if the two samples are positively correlated. Otherwise, if the samples S(t-T) and S(t) are maximally negatively correlated, the S(t-T) sample is added to the S(t) sample at the PTR. The interfering signal portions of the S(t-T) and S(t) samples cancel each other out in the course of such combination. The composite PTR sample resulting from such combination is thus a substantially free from interference Loran C signal.

Figure 3:
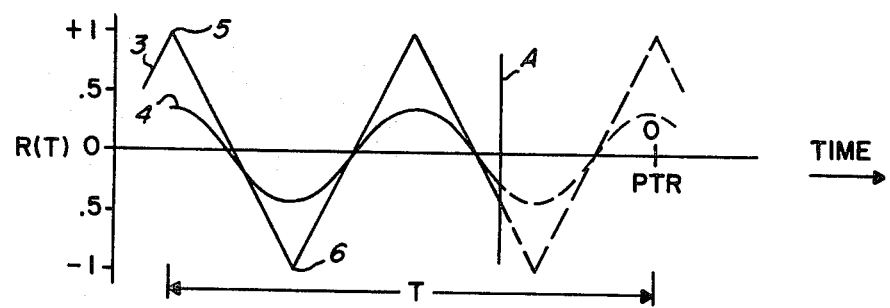
FIG. 3 shows a plot of the autocorrelation function of the interfering signal of FIG. 2 with respect to a selected pulse tracking reference point in the Loran C signal.

FIG. 3 is a graph of two typical interfering signal autocorrelation functions R(T) vs. time t. Autocorrelation function 3 results when the interfering signal exhibits a relatively large signal-to-noise ratio. Autocorrelation function 4 results when the interfering signal exhibits a signal-to-noise ratio somewhat less than that of the signal producing autocorrelation function 3. The dashed lines to the right of the vertical line A represent the portion of the autocorrelation function within the Loran C pulse. T is defined to be a measure of the amount of time prior to the S(t) PTR sample. It is seen that as T is varied, the S(t-T) sample of the interfering signal becomes maximally correlated with the S(t) sample as shown at 5 in FIG. 3. In such case, the S(t-T) sample of the interfering signal is subtracted from the PTR sample S(t) to cancel undesired interference. It is also seen that in FIG. 3 T may be further varied such that the S(t-T) sample is maximally anticorrelated with the S(t) sample as indicated at 6. In this instance the two samples are added together to cancel undesired interference at the PTR.

FIG. 4 shows a Loran C receiving apparatus capable of substantially attenuating an undesired interfering signal appearing near or within the receiver passband for the desired Loran C signals. The receiver according to the invention includes an antenna 10, preferably of the omnidirectional type, for receiving Loran C signals. Antenna 10 is coupled to the input of a radio frequency bandpass filter 20. Filter 20 exhibits a bandwidth commensurate with the frequencies of the Loran C signals for which reception is desired. Filter 20 is coupled to a hard limiter 30 such that incoming signals, whether they be the desired Loran C signals or undesired interfering signals, are limited and thus assume relative values of +1 or −1. More specifically, a positive polarity signal fed to the input of hard limiter 30 results in a signal having a +1 relative voltage value being generated at the output of limiter 30. Conversely, negative polarity signals provided to the input of limiter 30 result in a −1 relative voltage value being generated at the output of limiter 30.

Limiter 30 is coupled to the input of a sampling circuit 40 to enable sampling circuit 40 to sample the incoming limited received signals. As seen in FIG. 4, sampling circuit 40 samples the incoming signals at the current estimate of the PTR to create a plurality of PTR samples S(t), one for each pulse of a pulse group. Sampling circuit 40 includes a control input designated S(t) CONTROL which instructs sampling circuit 40 to sample incoming signals at the current estimate of the PTR as determined by a phase lock loop circuit 80. Phase lock loop circuit 80 is coupled to the S(t) CONTROL input of sampling circuit 40 and is explained subsequently in more detail. The PTR samples S(t) appear at the sampling circuit 40 output designated S(t). Sampling circuit 40 also samples the incoming interfering signal at at least one point in time determined by a signal provided to a T CONTROL input of sampling circuit 40. The auxiliary samples thus taken of the incoming interfering signal are provided to a sampling circuit 40 output designated S(t-T).

An interference detection circuit 45 includes inputs 45A and 45B for receiving the S(t-T) and S(t) samples respectively from the outputs of sampling circuit 40 as seen in FIG. 4. One interference detection circuit which may be employed as interference detection circuit 45 is described and claimed in the U.S. Patent Application, Jasper et al., Ser. No. 6-222,422, filed concurrently herewith on Jan. 5, 1981 and assigned to the instant assignee, the disclosure thereof being incorporated herein by reference. Interference detection circuit 45 is described in detail in the subsequent discussion of FIG. 6. Briefly, however, detection circuit 45 receives the PTR samples S(t) and the auxiliary samples S(t-T) and processes the same. Interference detection circuit 45 determines whether or not an interferer is present, and if present, determines a value of time T for which the S(t-T) samples occur at a peak of the autocorrelation function of such samples with respect to the S(t) samples. Detector 45 achieves this result by taking one or more S(t-T) samples per Loran C Pulse group. A control output 45C is coupled to the T CONTROL input of sampling circuit 40 to instruct circuit 40 when to sample in order to obtain the desired S(t-T) sample. Interference detector 45 determines the peak of the above-mentioned autocorrelation function by instructing sampling circuit 40 to take one or more auxiliary samples S(t-T) of the interfering signal at various times T per Loran C pulse until a sample S(t-T) is determined which occurs substantially at the peak of the autocorrelation function. Such highly correlated S(t-T) samples are provided to a positive input of a two input summer 60 via an amplifier 70 which is capable of passing the S(t-T) samples with or without a change of polarity as discussed later. A remaining negative input of the summer 60 is coupled to the S(t) output of sampling circuit 40. Thus, summing amplifier 60 combines each PTR sample S(t) with a corresponding maximally correlated auxiliary sample S(t-T) of the interfering signal such that the interfering signal portions of the S(t) samples are substantially cancelled or attenuated. Interference detector 45 is coupled to amplifier 70 in such a manner as to instruct amplifier 70 to polarize the S(t-T) samples appropriately in order to obtain interfering signal cancellation at summing amplifier 60.

The signal resulting from the combination of the S(t) and S(t-T) samples is generated at the output of summing amplifier 60 and coupled to the input of phase lock loop circuit 80. Phase lock loop circuit 80 is frequency and phase locked to the now substantially interference free S(t) signal produced at the output of summing amplifier 60. The substantially interference free S(t) signal generated at the output of phase lock loop circuit 80 provides accurate PTR location information. Such substantially interference free S(t) sample signal is fed to the S(t) CONTROL input of sampling circuit 40 to instruct sampling circuit 40 to sample the incoming Loran C signal at the present estimate of the time of occurrence of the PTR.

For completeness, an interference detection circuit is presently discussed which may be employed as interference detection circuit 45 to determine the period of a signal interfering with a Loran C signal. As already mentioned, detector 45 determines the period of an interfering signal, and hence the frequency of the interfering signal, by sampling the interfering signal in such a manner as to generate a sample occurring in time at a peak of the autocorrelation function of the interfering signal with respect to a predetermined reference point (PTR) during the Loran C pulses.

Figure 5:
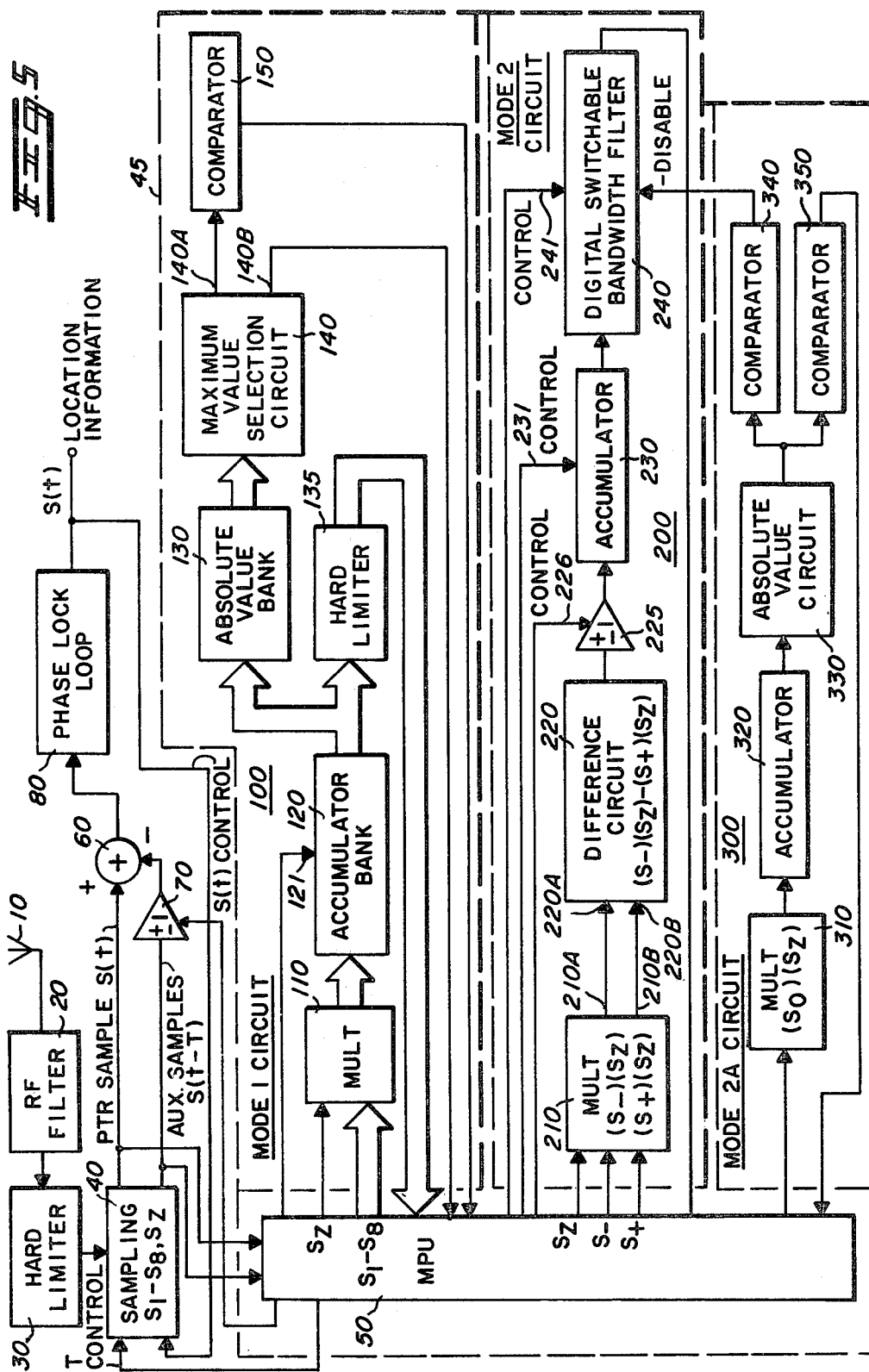
FIG. 5 is a more detailed block diagram of the interference attenuator of FIG. 4.

More specifically, interference detector 45 includes an electronic processor 50, for example a microprocessor, including data inputs 45A and 45B for respectively receiving auxiliary samples S(t-T) and PTR samples S(t) from sampling circuit 40 as shown in FIG. 5. A circuit 100 operative in a first mode (Mode 1) determines an auxiliary sample S(t-T) having an appropriate T such that the auxiliary sample occurs approximately at a peak of the autocorrelation function of the interfering signal with respect to the selected Loran C signal reference point. Mode 1 circuit 100 includes a bank of multiplier circuit 110 coupled to processor 50. Multiplier circuit bank 110 includes a number of multipliers equal to the number of auxiliary samples S(t-T) taken of the interfering signal per Loran C signal pulse. In this embodiment, a set of eight samples are taken at different equally spaced times $T_1$ through $T_8$ prior to each Loran C signal reference point. Other embodiments of the invention take such samples after each Loran C pulse, the criteria being that the sample or samples occur at a time not during the Loran C pulses. Multiplier circuit bank 110 thus includes eight multiplier circuits therein, each multiplier having two inputs. Each multiplier of bank 110 operates on a different one of the S(t-T) samples which are conveniently provided to bank 110 via processor 50. For example, the first multiplier of bank 110 multiplies the S(t) Loran C signal sample (conveniently designated $S_z$ in FIG. 5) by the auxiliary sample $S(t-T_1)$. The second multiplier of bank 110 multiplies the S(t) sample by the $S(t-T_2)$ sample and so forth.

The outputs of the multipliers of bank 110 are coupled to respective inputs of an accumulator bank 120 including a number of accumulators equal to the number of multipliers of bank 110. Each of the accumulators of bank 120 accumulates the total value of the multipled samples provided at the inputs of accumulator bank 120. Accumulators 120 continue totaling such samples until a predetermined number L of Loran C signal pulses have transpired. A typical value for L is L=120. The accumulators 120 are then zeroed (conveniently by processor 50) and reinitiate such accumulation. Accumulators 120 are reset to zero once every L Loran C pulses by a control signal from processor 50 provided to accumulators 120 by a control line 121 coupled thereto. The output of each accumulator of accumulator bank 120 is coupled to the input of a respective absolute value circuit of absolute value circuit bank 130 such that each of the accumulated sample products has the same positive polarity. The polarity of the product samples is thus uniform. Absolute value bank 130 includes a number of absolute value circuits equal to the number of auxiliary samples $S(t-T)$ taken per Loran C pulse (eight in the sample set of this example). Each of the eight outputs of absolute value bank 130 exhibits a different autocorrelation function value. That is, the first absolute value circuit (not specifically shown) of bank 130 exhibits the autocorrelation function value of the $S(t-T_1)$ interfering signal sample with respect to the $S(t)$ Loran C signal reference point sample. The second absolute value circuit of bank 130 exhibits the autocorrelation function value of the $S(t-T_2)$ sample at the output thereof and so forth throughout the eighth absolute value circuit bank 130 which exhibits the autocorrelation function value of the $S(t-T_8)$ sample at the output thereof. Thus a plurality of autocorrelation function values are present at the outputs of bank 130. A hard limiter 135 is coupled to the outputs of accumulator bank 120. The output of limiter 135 is coupled to electronic processor 50 such that processor 50 is provided polarity data for each of the products accumulated by accumulator bank 120. The polarity of each of the autocorrelation function values determined by accumulator bank 120 is thus known to processor 50.

The $S(t-T)$ sample which results in the largest autocorrelation function value is the current sample occurring closest to a peak of the autocorrelation function. Such $S(t-T)$ sample is thus the sample of the eighth sample set closest in period and frequency to the period and frequency of the interfering singal. To determine such autocorrelation function of maximum value the outputs of absolute value bank 130 are coupled to respective inputs of a maximum value selection circuit 140. Maximum value selection circuits such as 140 are well known to those skilled in the art. The maximum autocorrelation function value is thus determined by selection circuit 140 and provided to the input of a comparator 150. If a relatively small amplitude interfering signal is present, the eight autocorrelation function values exhibit a correspondingly relatively low value. The autocorrelation function value of greatest magnitude is thus respectively small. However, if interference is present which exhibits a substantial amplitude, the selected autocorrelation function value of greatest magnitude will have a relatively large value. A predetermined threshold voltage TH is provided to comparator 150 such that if the selected autocorrelation function value of greatest magnitude exceeds TH, an interfering signal of substantial magnitude is deemed to have been received. The output of comparator 150 is coupled to electronic processor 50 such that when an autocorrelation function value is generated which has a value greater than the TH threshold, the value of such autocorrelation function value and the corresponding T are appropriately stored in processor 50. Processor 50 includes a T CONTROL output coupled to sampling circuit 40 for adjusting the sampling times $T_1$ through $T_8$ as per previous discussion of sampling circuit 40.

When the autocorrelation function exceeds the TH threshold, interference detector 45 becomes operative in a second mode via a Mode 2 circuit 200 included in detector 45. Mode 2 circuit 200 is coupled to electronic processor 50. Referring momentarily to FIG. 6A a graph of the autocorrelation function of the interfering signal with respect to the PTR of the Loran C signal is presented. $R_0$ is shown near the peak of the autocorrelation function as the $S_\phi$ strobe. The autocorrelation function value of greatest value determined by Mode 1 circuit 100. Autocorrelation function values $R_{-1}$ and $R_1$ are situated on either side of autocorrelation function value $R_0$ as shown. $S_\phi$ is defined to be the sample of the set $S(t-T_2)$ through $S(t-T_7)$ which corresponds to the autocorrelation function value $R_0$ of greatest value. $S_-$ and $S_+$ are the samples occurring immediately prior to and immediately after the $S_\phi$ sample, respectively resulting in the $R_{-1}$ and $R_1$ autocorrelation function values as seen in FIG. 6A. It is noted that although the $R_0$ autocorrelation function value of the greatest value, $R_0$ does not occur exactly at the peak of the autocorrelation function as desired. Mode 2 circuit 200 operates to shift the sampling times of the auxiliary sample set $S(t-T)$ until the $R_0$ autocorrelation function value (that is, the $S_\phi$ sample) occurs at the peak of the autocorrelation function waveform. As seen in FIG. 6B, this desired result is achieved when the autocorrelation function values corresponding to the $S_{31}$ and $S_+$ samples have equal value, that is, when their difference equals 0. Mode 2 circuit 200 operates to drive the difference between the autocorrelation function values corresponding to the $S_-$ and $S_+$ samples to 0 and thus assures that the $S_\phi$ samples and the corresponding $R_0$ autocorrelation function value occur at the peak of the autocorrelation function waveform.

More specifically, Mode 2 circuit 200 includes first and second multipliers designated multiplier bank 210 operatively coupled to electronic processor 50 so as to receive $S_z$ (heretofore $S(t)$), $S_-$ and $S_+$ samples at the inputs thereof as shown in FIG. 5. The first multiplier multiplies the current $S_-$ and $S_z$ samples together, the result being generated at the output of the first multiplier. The second multiplier multiplies the $S_+$ and $S_z$ samples together and generates the result at the output thereof. The outputs of multiplier bank 210 are coupled to the input of a difference circuit 220 which subtracts the product $(S_+)(S_z)$ from the product $(S_-)(S_z)$ and generates the result at the output thereof. The output of difference circuit 220 is coupled to the input of a multiplier circuit 225. Multiplier 225 multiplies the output signal of difference circuit 220 by $+1$ or $-1$ when so instructed by processor 50. More specifically, when the polarity of the autocorrelation function values of the interfering signal is positive as indicated to processor 50 by hard limiter 135, processor 50 causes multiplier 225 to multiply the output signal of difference circuit 220 by $+1$. If the polarity of the autocorrelation function values of the interfering signal is negative according to hard limiter 135, processor 50 instructs multiplier 225 to multiply the output signal of difference circuit 225 by $-1$. Thus, the difference signal between the two products $(S_-)(S_z)$ and $(S_+)(S_z)$ is provided the appropriate sign $+1$ according to the polarity of the autocorrelation function values comprising such products.

Initially the difference of the products is accumulated for K number of Loran C pulses in accumulator 230 which is coupled to the output of difference circuit 220. The accumulated output of accumulator 230 yields an indication of the amount of error in the timing of the $S_\phi$ strobe. This accumulated total of product differences is provided to the input of a digital switchable bandwidth filter 240. Switchable bandwidth filter 240 subjects the accumulated product differences provided by accumulator 230 to a relatively broad bandwidth filtering action for the first K pulses operated on by mode 2 circuit 200. Typically an initial value of K is 24. After each group of K Loran C pulses, accumulator 230 is reset to zero by action of a signal from processor 50 coupled to accumulator 230 by the accumulator control line 231 shown in FIG. 6. While the first J groups (J is a number, typically 36) of K Loran C pulses are operated on by mode 2 circuit 200, digital switchable bandwidth filter 240 maintains the above-mentioned relatively broad bandwidth filtering characteristic. However, after mode 2 circuit 200 operates on the first J groups of K Loran C pulses, accumulator 230 is reset to zero and initializes accumulation again for a substantially larger number of Loran C pulses than K equals 24, for example, K equals 720. While mode 2 circuit 200 is operating on this second larger number of K Loran C pulses, the digital switchable bandwidth filter 240 is switched to exhibit a narrower bandwidth filter than it exhibited initially for the first J groups of K pulses. The above parameter changes are accomplished by appropriate control signals issued by processor 50 to accumulator 230 and filter 240 on respective control lines 231 and 241. The output signal of switchable bandwidth filter 240 is an error signal which gives an indication of how far removed in time the $S_\phi$ sampling strobe is from the peak of the autocorrelation function. The output of filter 240 at which such error signal is present is coupled via electronic processor 50 to sampling circuit 40 to control and adjust the sampling times of sampling circuit 40 until the selected $S_\phi$ sample within the $S_1$ through $S_8$ sample set occurs at the peak of the autocorrelation function of the interfering signal. Thus, mode 2 circuit 200, processor 50 and sampling circuit 40 together form a control loop which operates to optimally time the $S_\phi$ sampling strobe. The initial parameter K equals 24 selected for accumulator 230 and the corresponding relatively broad bandwidth exhibited by filter 240 under such conditions results in a relatively fast attack or rise time during which the $S_\phi$ sample is positioned in time near the peak of the autocorrelation function. However, the subsequent parameter K equals 720 selected for accumulator 230 and the corresponding relatively narrow bandwidth exhibited by filter 240 under such condition results in an increasingly accurate error signal being provided to processor 50 and associated sampling circuit 40 as the optimal timing of the $S_\phi$ sample is zeroed in on. As the accuracy of the $S_\phi$ sample tracking with the peak of the autocorrelation function of the interfering signal becomes greater, the error signal at the output of filter 240 becomes correspondingly lesser and eventually approaches zero as maximum accuracy is obtained.

A mode 2A circuit 300 is coupled to electronic processor 50 to achieve ultra-fine tuning of the $S_\phi$ sample such that the $S_\phi$ sample corresponds in time with the peak of the autocorrelation function of the interfering signal as closely as possible. More specifically, mode 2A circuit 300 includes a multiplier 310 coupled to electronic processor 50 so as to continuously receive the current $S_\phi$ and $S_z$ samples determined by the mode 1 and mode 2 circuits 100 and 200 and associated circuitry. Multiplier 310 performs the initial step required for determining the autocorrelation function value of the $S_\phi$ samples with respect to the corresponding $S_z$ samples of the Loran C pulses. More specifically, multiplier 310 accomplishes this by multiplying each $S_{518}$ sample by the corresponding $S_z$ sample for each Loran C pulse. Each $(S_\phi)(S_z)$ product thus determined is provided to the input of an accumulator 320 which accumulates $(S_\phi)(S_z)$ products for a number M Loran C pulses where M equals 720, for example. It is noted that since the highest value each $(S_\phi)(S_z)$ product may attain is $\pm 1$, the highest value which may be generated at the output of accumulator 320 is $+720$ or plus or minus the value selected for M.

The output of accumulator 320 is coupled to the input of an absolute value circuit 330 to assure that the accumulated output of accumulator 320 exhibits a positive polarity prior to comparison with predetermined threshold levels as explained subsequently. The output of absolute value circuit 330 is coupled to the input of a comparator 340. Comparator 340 compares the accumulated total of $(S_\phi)(S_z)$ products with a predetermined threshold near the value of M selected for accumulator 320. For example, if M equals 720, a typical value of the threshold level associated with comparator 340 is 715. If the accumulated total from accumulator 320 exceeds this threshold level, here 715, extreme correlation between the $S_\phi$ samples and the $S_z$ samples is indicated. Under this condition comparator 340 produces an output signal which operates to disable digital switchable bandwidth filter 240 via a connection between the comparator 340 output and a disable terminal of filter 240 as seen in FIG. 6. As already discussed in the description of the method of the invention, such disabling of the digital switchable bandwidth filter desirably allows the highly accurately timed $S_\phi$ samples to remain undisturbed at the desired precise timing at the peak of the autocorrelation function. Ultra-fine tuning of the $S_\phi$ sampling strobe is thus achieved. The amount of time between the $S_\phi$ strobe and the $S_z$ strobe at the PTR therefore exhibits highly accurate indicia of both the period and the frequency of the interfering signal.

The output of absolute value circuit 330 is also coupled to the input of a comparator 350 for determining if the interfering signal has ceased or declined in magnitude to such a low threshold level that interference frequency detection and interference attenuation is not desired. Again, it is noted that the maximum accumulated $(S_\phi)(S_z)$ product total which may possibly be provided to the input of comparator 350 equals M (here 720), that is the number of Loran C pulses upon which accumulator 320 operates before being reset to zero. If the accumulated total of $(S_\phi)(S_z)$ products is substantially less than M, then the interfering signal has either ceased or diminished to such a low level that it may be ignored. For M equals 720, the threshold level of comparator 350 is conveniently set at 288. Comparator 350 operates such that if the accumulated product total is less than or equal to 288, electronic processor 50 then operates to return the apparatus of the invention back to the mode 1 state and the search for an interfering signal is thus reinitiated. (The output of comparator 350 is coupled to electronic processor 50 as shown in FIG. 6.)

Interference detector 45 through operation of Mode 1 circuit 100, Mode 2 circuit 200 and Mode 2A circuit 300 thus provides a control signal to the T CONTROL input of sampling circuit 40 which instructs circuit 40 to take a $S_\phi$ auxiliary sample at times corresponding to peaks of the autocorrelation function of an interfering signal with respect to selected pulse timing reference points of the Loran C pulses. The $S_\phi$ samples thus derived are combined at summer 60 with respective S(t) (that is, $S_z$) samples to substantially eliminate interference from such S(t) PTR samples. Accurate tracking of the PTR is thus enabled despite the presence of interference. Although Mode 1 circuit 100, Mode 2 circuit 200 and Mode 2A circuit 300, circuits 60, 70 and 80 are shown as being external to proce-sor 50 in FIG. 5, in other embodiments of the invention such circuits are conveniently incorporated within processor 50. FIG. 7 is a flowchart of the operation of processor 50 when such circuits are incorporated therein.

Figure 7A:
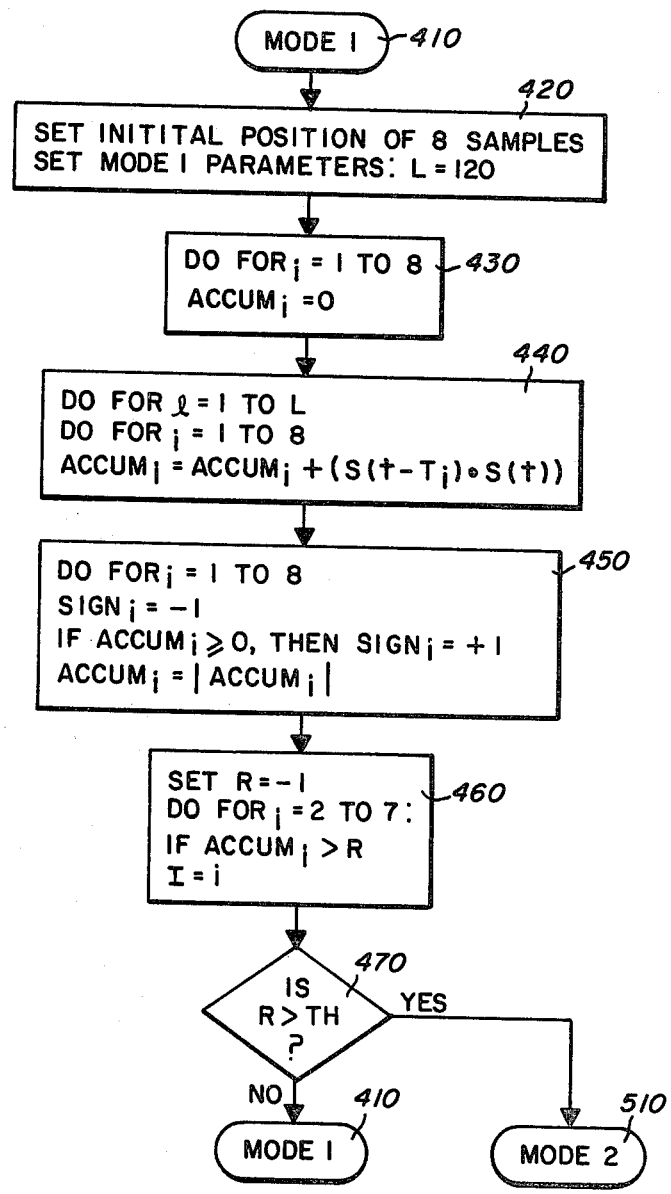
Figure 7C:
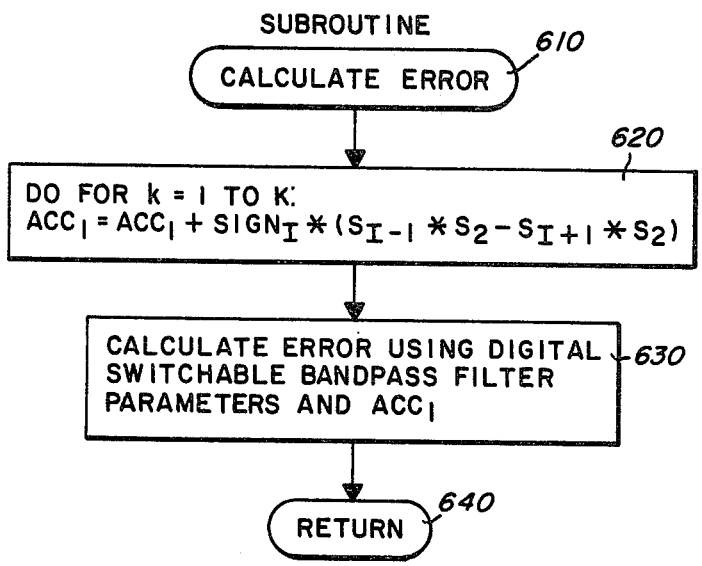

FIG. 7A is a flowchart of the Mode 1 portion of interference detector 45. Mode 1 is initialized at step 410 as shown. The times at which sampling circuit 40 takes the initial 8 samples $S, -S_8$ are determined, and the Mode 1 parameter L is set at 120 in step 240. Steps 430 and 440 achieve accumulation of $S(t-T_i)$. S(t) products, such accumulated products being designated $ACCUM_i$ products. In the embodiment of FIG. 6, such products are generated by multiplier 110 and are accumulated by accumulator bank 120. Referring again to FIG. 7A, step 450 generates the absolute value of such accumulated products and determines the polarity of such products. These functions are respectively performed by absolute value bank 130 and hard limiter 135. The largest of the accumulated products $S(t-T_i)$. S(t) is determined in step 460 and is designated R after such maximum value selection occurs. This corresponds to the selection of the autocorrelation function of greatest value by maximum value selection circuit 140. Step 470 determines if such R exceeds a predetermined threshold level TH in a manner akin to the way comparator 150 performs the operation. If R exceeds TH, an interfering signal has been detected and Mode 2 is amended. If R fails to exceed TH, Mode 1 is continued by returning to step 410.

FIG. 7B is a flowchart of the Mode 2 portion of interference detector 45. Mode 2 is initialized at step 510. The parameter J and K, already discussed, are initialized at 36 and 24 respectively in step 520. Also, the digital switchable bandwidth filter is provided with appropriate parameters to cause it to exhibit a wide bandwidth in step 520. ACC1 is set to zero in step 530. This is the equivalent of setting accumulator 230 to zero in FIG. 6. Step 530 proceeds to a subroutine CALCULATE ERROR (step 610) which determines the amount of error in the sampling strobe closest to the peak of the autocorrelation function of the interfering signal. As seen in step 620 of FIG. 7C $ACC_1 = ACC_1 + SIGN_I*(S_{I-1}*S_z - S_{I+1}*S_z)$. This expression is readily understood in light of the previous discussion of Mode 2, specifically multiplier 210, difference circuit 220, multiplier 225 and accumulator 230 and filter 240 thereof. $S_{I-1}$, and $S_{I+1}$ are defined to be the S_ and S+ samples respectively. $S_z$ is the current PTR estimate. $SIGN_I$ is polarity information like that provided by hard limiter 135. The expression just recited for $ACC_1$ provides an error signal when accumulated from k=1 to K in step 620 under the present selected digital switchable bandpass filter parameter referred to in step 630. This error signal contains indicia of how far removed in time the $S_\phi$ strobe is from the peak of the autocorrelation function of the interfering signal. Step 640 executes a return causing the subroutine to return operation to the end of step 530 in Mode 2. The Mode 2A parameter K and M are both set to 720 in step 540. The digital switchable bandwidth filter (240) is provided with appropriate parameters in step 530 to cause it to exhibit a narrow bandwidth.

Mode 2A is initiated in step 810. $ACC_1$ and $ACC_3$ are set to zero in step 820. $ACC_3$ is defined to equal $ACC_3 + (S_\phi*S_z)$ when accumulated from m=1 to M as in steps 830. Multiplier 310 and accumulator 320 cooperate to achieve this result in the apparatus of FIG. 6. The absolute value of $ACC_3$ is determined in step 840 in a manner similar to the function of absolute value circuit 330. Decision step 850 determines if $ACC_3$ is less than a predetermined threshold THRESH 2. If such is the case, Mode 1 is implemented again. If $ACC_3$ is not less than such threshold, a further decision step 860 is implemented in which $ACC_3$ is compared with another threshold THRESH 1. Such comparisons are in effect implemented by comparator 340 and 350. If $ACC_3$ is greater than THRESH 1, then ERROR is determined to be zero as per step 870. In such case of no error, the timing of the eight sampling strobes $S_1-S_8$ is proper and no time adjustment is required in STEP 890. However, if $ACC_3$ is greater than THRESH 1, error in the timing of the $S_1-S_8$ sampling strobes, specifically $S_\phi$, is present. In this event, such error is calculated by subroutine CALCULATE ERROR as per step 880.

After the error is calculated in the subroutine, the known error is used to adjust the position, that is timing of the $S_1-S_8$ samples such that the $S_\phi$ sample thereof is properly timed to occur at the peak of the autocorrelation function of the interfering signal.

Figure 7D:
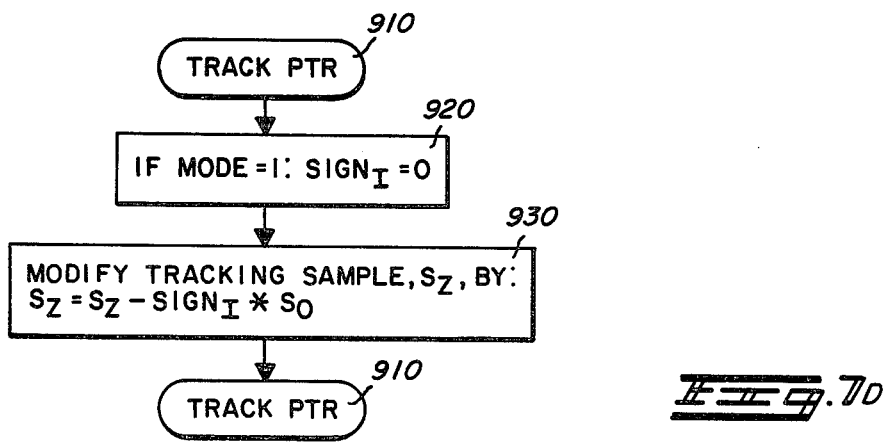

To attenuate the interfering signal, the steps shown in FIG. 7D are implemented. PTR tracking continues as per step 910. If Mode 1 interference detection is being performed, interference attenuation is not yet desired. In light of this $SIGN_I$ (later discussed) is set to zero in step 920 if such is the case. Step 930 implements interference attenuation by effectively subtracting the current $S_\phi$ sample from the current $S_z$ PTR sample according to the relationship $S_z = S_z - SIGN_I*S_\phi$. The value of $SIGN_I$ is set to +1 or -1 as needed to assure that interference attenuation occurs.

The foregoing describes an apparatus and a method for substantially attenuating undesired radio frequency signals appearing within the Loran C signal bandpass without distorting the Loran C signal pulses.

While only certain preferred features of the invention have been shown by way of illustration, many modifications and changes will occur to those skilled in the art. It is, therefore, to be understood that the present claims are intended to cover all such modifications and changes as fall within the true spirit of the invention.

We claim:
1. An apparatus for substantially cancelling an undesired signal interfering with a Loran C signal comprising:
  receiving means for receiving signals which include a Loran C signal and an undesired interfering signal;
  sampling means, coupled to said receiving means, for sampling the pulses of said Loran C Signal at a PTR thereof and for sampling said interfering signals at selected points in time;
  autocorrelation function determining means, coupled to said sampling means, for determining a peak of the autocorrelation function of the interfering signal with respect to the PTR samples of the Loran C pulses, said selected points in time being defined to occur substantially at said peak, and combining means, coupled to said sampling means for combining the samples of said interfering signals with the corresponding samples of said Loran C signals so as to substantially cancel said interfering signal.

2. The apparatus of claim 1 wherein said receiving means includes a hard limiter for converting positive polarity undesired signals and Loran C signals to signals having +1 relative values and for converting negative polarity undesired signals and Loran C signals to signals having −1 relative values.

3. A method for cancelling an undesired signal interfering with a desired Loran C signal including a plurality of Loran C radio frequency pulses comprising the steps of:
 (a) receiving signals which include a Loran C signal and an undesired signal interfering therewith;
 (b) sampling said Loran C signal substantially at a PTR of the pulses thereof to form a plurality of PTR samples;
 (c) sampling said undesired signal at least once for each Loran C pulse at a time adjacent to, but not during, each Loran C pulse to form a plurality of undesired signals sample sets;
 (d) determining a time at which a peak of the autocorrelation function of the undesired signal with respect to the PTR samples occurs;
 (e) selecting the samples of said sets which occur the closest to said time at which a peak of the autocorrelation function of the undesired signal with respect to the PTR samples occurs, and
 (f) combining the undesired signal samples selected in step (e) together with the corresponding PTR samples such that the undesired signal is substantially cancelled.

4. The method of claim 3 including the step of hard limiting said first and second signals prior to sampling said first and second signals.

5. A method of cancelling an undesired signal interfering with a desired Loran C signal including a plurality of Loran C radio frequency pulses comprising the steps of:
 (a) receiving the signals which include the said undesired signal and said Loran C signal;
 (b) sampling said Loran C signal substantially at a PTR of the pulses thereof to form a plurality of samples S(t);
 (c) sampling said interfering signal at a plurality of sampling times T prior to each of said Loran C pulses to form a plurality of samples S(t-T) for each Loran C pulse;
 (d) determining the autocorrelation function values of said S(t-T) samples with respect to the corresponding S(t) sample;
 (e) varying the sampling time T until a selected S(t-T) sample occurs at a peak of the autocorrelation function of the undesired signal with respect to the S(t) samples; and
 (f) combining the S(t-T) samples occurring at a peak of the autocorrelation function to the corresponding S(t) samples such that the undesired interfering signal is substantially cancelled.

6. The method of claim 5 wherein said undesired signal and said Loran C signal are hard limited prior to sampling said undesired signal and said Loran C signal.

* * * * *